US 11,919,649 B2

(12) United States Patent
Boisson

(10) Patent No.: US 11,919,649 B2
(45) Date of Patent: Mar. 5, 2024

(54) DEVICE FOR MEASURING THE THICKNESS OF AN ACCRETION OF ICE ON A SURFACE AND AIRCRAFT PROVIDED WITH SUCH A DEVICE

(71) Applicant: Airbus Operations SAS, Toulouse (FR)

(72) Inventor: Thomas Boisson, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 102 days.

(21) Appl. No.: 17/750,715

(22) Filed: May 23, 2022

(65) Prior Publication Data
US 2022/0380057 A1 Dec. 1, 2022

(30) Foreign Application Priority Data
May 25, 2021 (FR) ........................................ 2105380

(51) Int. Cl.
B64D 15/20 (2006.01)
(52) U.S. Cl.
CPC .................................. B64D 15/20 (2013.01)
(58) Field of Classification Search
CPC ........ B64D 43/02; B64D 15/20; B64D 43/00; B64D 15/12; B64D 1/18; B64D 1/20; B64D 15/16; B64D 15/22; B64D 2033/0286; B64D 33/02; B64D 45/00; B64D 33/08
USPC ...................................................... 73/170.02
See application file for complete search history.

(56) References Cited

U.S. PATENT DOCUMENTS

| 5,313,202 | A | * | 5/1994 | Hansman, Jr. | ......... | B64D 15/20 |
| | | | | | | 340/580 |
| 7,719,697 | B2 | | 5/2010 | Roques | | |
| 9,769,431 | B2 | * | 9/2017 | Shi | .......... | B64D 15/20 |
| 2012/0085868 | A1 | | 4/2012 | Barnes | | |
| 2013/0113926 | A1 | | 5/2013 | Chen et al. | | |
| 2015/0103867 | A1 | * | 4/2015 | Meis | ....... | B64D 15/20 |
| | | | | | | 374/183 |
| 2015/0115105 | A1 | * | 4/2015 | Renno | .................... | B64D 15/20 |
| | | | | | | 244/134 F |
| 2015/0163460 | A1 | | 6/2015 | Shi et al. | | |
| 2017/0369177 | A1 | * | 12/2017 | LoPresto | ................ | B64D 47/08 |
| 2018/0319506 | A1 | * | 11/2018 | LoPresto | ................ | B64D 15/22 |

FOREIGN PATENT DOCUMENTS

| CN | 106197294 | A | | 12/2016 | | |
| CN | 208053657 | U | | 11/2018 | | |
| CN | 110525664 | A | * | 12/2019 | ............. | B64D 15/20 |
| CN | 112572809 | A | | 3/2021 | | |
| FR | 2882590 | A1 | | 9/2006 | | |

* cited by examiner

Primary Examiner — Andre J Allen
(74) Attorney, Agent, or Firm — Greer, Burns & Crain, Ltd.

(57) ABSTRACT

A device for measuring the accretion of ice on a studied surface. The device has two arms, a first arm and a second arm, the second arm forming an enclosure for housing an image acquisition system disposed to acquire, through an orifice, images of a part of the studied surface located on the first arm. The device thus makes it possible to dissociate the support of the image acquisition system from that of the studied surface on which ice accumulates. Consequently, it is possible to place the second arm in the direction of the flow of the stream of air flowing along the aircraft while the first arm passes through the stream.

15 Claims, 1 Drawing Sheet

DEVICE FOR MEASURING THE THICKNESS OF AN ACCRETION OF ICE ON A SURFACE AND AIRCRAFT PROVIDED WITH SUCH A DEVICE

CROSS-REFERENCES TO RELATED APPLICATIONS

This application claims the benefit of the French patent application No. 2105380 filed on May 25, 2021, the entire disclosures of which are incorporated herein by way of reference.

FIELD OF THE INVENTION

The present invention relates to devices for measuring the presence and thickness of the accretion of ice on a surface in real time and more particularly, in this case, on the outer surface of an aircraft (fuselage, wing, empennage, etc.).

BACKGROUND OF THE INVENTION

Ice is formed by accretion on the surface of components in relief relative to the outer surface of aircraft in flight such as, for example, the surface of probes. However, the accretion of ice on the surface of a component can alter the operation thereof. In addition, it modifies the profile of the aircraft to which it is fastened and increases the weight thereof. It is therefore important to study the formation thereof, in particular during flight tests.

Application FR2882590 filed by Airbus France describes a probe for measuring the thickness of the ice on the surface of the aircraft.

The present invention aims to provide an alternative solution.

SUMMARY OF THE INVENTION

To this end, the present invention relates to a device for measuring the accretion of ice on a studied surface, characterized in that it has two arms, a first arm and a second arm, the second arm forming an enclosure for housing an image acquisition system, the axis Y, the central longitudinal axis of the portion of the second arm bearing the acquisition system making an angle $\alpha$ with the axis X, the central longitudinal axis of the part of the first arm bearing the studied surface, the image acquisition system being disposed so as to acquire, through an orifice provided for this purpose, images of a part of the surface of the first arm that is of interest, the studied surface.

The device thus makes it possible to dissociate the support of the image acquisition system from that of the studied surface on which ice accumulates. Consequently, it is possible to place the second arm in the direction of the flow of the stream F of air flowing along the aircraft while the first arm passes through the stream. As will be seen below, it is also possible to protect the acquisition system against any formation of ice while at the same time allowing ice to form on the studied surface.

The invention provides at least one of the following optional features, taken individually or in combination.

The two arms respectively have rigid cylindrical tubes.

The first arm bears a plate of which the surface that is oriented towards the acquisition system has markers making it possible to evaluate the thickness of the ice.

The plate is in a transverse plane orthogonal to the central longitudinal axis of the tube.

The markers are in the form of a scale for measuring lengths corresponding to the thickness of ice on the studied surface.

The plate comprises different backlighting depending on the operating phases.

The second arm is provided with a heating system that makes it possible to heat and/or de-ice, at least partially, the enclosure that houses the image acquisition system.

The heating system has a temperature regulation system that makes it possible to measure the temperature so that it is high enough to allow the heating and/or de-icing and not excessive so as not to impair the operation of at least the image acquisition system.

The second arm houses a device emitting a laser beam making it easier to measure the thickness of ice.

The first arm has an elbow dividing it into two parts on either side of this elbow, one bearing the second arm and the other having the studied surface.

The axis Y of the second arm makes an angle $\alpha$ of approximately 90 degrees with the axis X of the first arm bearing the studied surface.

The second arm has a plurality of portions, a first portion fastened to the first arm, a second portion removably associated with the first portion and housing the acquisition system and a third portion removably associated with the second portion and closing the enclosure.

The free end of the second arm, which is the end opposite that connected to the first arm, has a shape of which the perimeter decreases continuously as far as its free end.

The first arm comprises a device for lighting the ice so as to illuminate it.

The present invention also relates to an aircraft comprising a measurement device comprising one or more of the features presented above in which the first arm, at one of its free ends, is fastened to the aircraft such that it forms a projection with respect to the surface of the aircraft and such that the studied surface passes through the stream of air F flowing along the outer surface.

According to one possible embodiment, the second arm is in the direction of the stream of air F so as to avoid turbulence as much as possible.

BRIEF DESCRIPTION OF THE DRAWINGS

Other objects, features and advantages will become apparent from the following description of the invention, which description is given solely by way of non-limiting example, with reference to the accompanying drawings, in which.

DETAILED DESCRIPTION OF THE PREFERRED EMBODIMENTS

Figure 1:
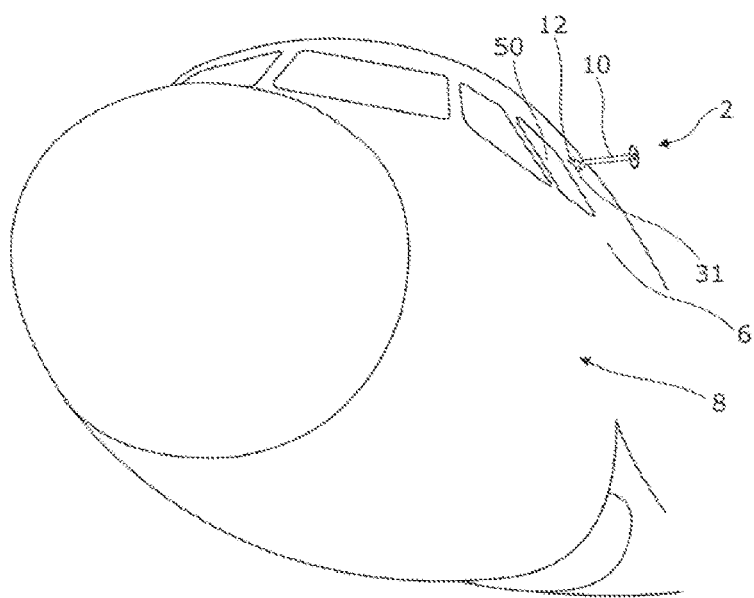
FIG. 1 is a simplified perspective view of a nose of an aircraft in flight having a measurement device according to the present invention.
Figure 2:
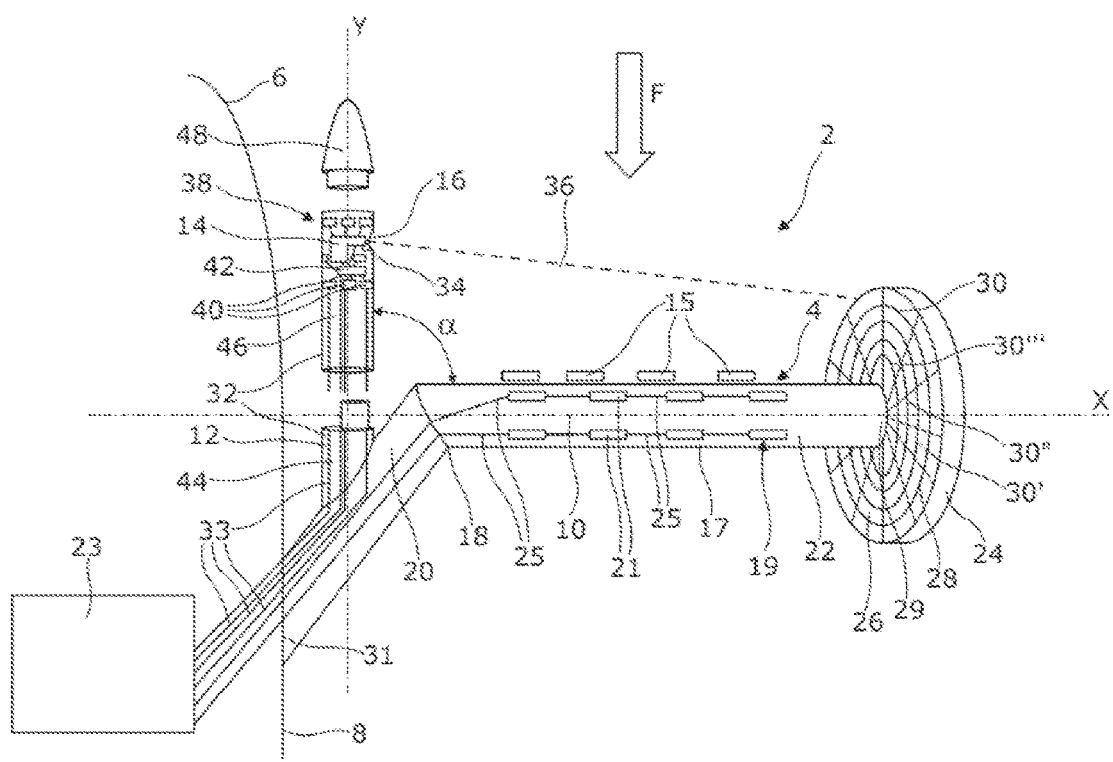
FIG. 2 is a schematic perspective view of a measurement device according to the present invention.

As shown in FIGS. 1 and 2, the present invention relates to a device 2 for measuring the thickness of an accretion of ice on a surface of the device, which will be called the studied surface 4, during a flight of an aircraft 8. The device comprises a first and a second arms 10, 12, of which one, in the embodiment illustrated the first arm 10, is fastened to the surface 6 of an aircraft 8. The first arm 10 forms a projection with respect to the surface 6 of the aircraft. The first arm 10 simulates the components that extend in relief relative to the surface of the aircraft and are subjected to the accretion of ice. The first arm 10 passes through the stream of air F flowing along the outer surface 6 of the aircraft 8 (shown by an arrow F in FIG. 2) and a part of its surface corresponds to the studied surface 4. The second arm 12 forms an enclosure for housing an image acquisition system 14 shown schematically in FIG. 2 disposed so as to acquire, through an orifice 16 provided for this purpose, images of the studied surface 4. The images may be photos, a succession of photos forming a video, sets of points measured in three dimensions, namely any type of image allowing the shape of the surface to be perceived, at least partially. The shape is understood in a very broad sense and can cover, for example, the overall outline or a profile. The orifice 16 may be a through-hole that is open, through which air passes, or closed by a panel made of material allowing image acquisition, for example a transparent material such as a window.

The first arm 10 has an oblong envelope. In the embodiment illustrated, the first arm 10 has a tube 17 that in the embodiment illustrated is of cylindrical shape of circular section. The shape of the arm could be different. The first arm is hollow so as to allow the wires/cables necessary for the operation of the various components described below to pass through. However, it could be solid or partially hollow in the case of the use of wireless technology or components that do not require power supply or connection to a control system. The first arm 10 is constituted of one or more materials giving it a rigid structure that allows it to be solid enough to withstand the stream F and not deform, or deform only very slightly. The tube 17 in the example illustrated is made of metal such as aluminum. The first arm 10 has an elbow 18 dividing it into two parts 20, 22 on either side of this elbow, one 20 bearing the second arm 12 and the other 22 having the studied surface 4. The central longitudinal axis Y of the second arm 12 and, in particular, the portion bearing the acquisition system, makes an angle α in the example illustrated of approximately 90 degrees with the central longitudinal axis X of the first arm 10 and, more particularly, the part 22 of the second arm bearing the studied surface 4. The length of the second arm 12, the positioning of the orifice 16 and also of the acquisition system 14 and also the angle α are determined such that once the acquisition system is positioned in the second arm, all of the studied surface 4 is covered. Adjustment is then no longer needed. The device can be removed and reused with no need for adjustment to cover the surface 4.

The first arm 10 can comprise a de-icing system 19 making it possible to remove the ice for any new use. This will not be described in greater detail; a large number of embodiments are known nowadays, such as, for example, those using de-icing resistors 21. In the embodiment illustrated, the de-icing system 19, namely in this case the set of resistors 21, is connected to a control system 23 by wires 25 passing through the inside of the tube 17. The control system 23 is, in the embodiment illustrated, shown in the aircraft but any other configuration could be possible such as a ground control system. The system 19 may have a temperature regulation and limiting system so as to ensure the safety of the measurement device.

The first arm 10 bears a plate 24 of which the surface 26 that is oriented towards the acquisition system 14 and the outer surface 6 of the aircraft has markers 28 making it possible to evaluate the thickness of the ice on the surface 4. The plate 24 and its system of markers 28 accompany the system 14 for acquiring photos or videos (camera 14) so as to improve the visual analysis thereof, whether by a human being or a machine algorithm. In other embodiments for example using laser technologies for the acquisition system (profilometer, lidar with three-dimensional surveying, etc.), the plate with markers would no longer be necessary. The markers 28 may be realized in various ways. In the embodiment illustrated, the plate 24 is in the shape of a disc but could assume any other shape. The plate 24 is at one of the free ends 29 of the first arm, the other end 31 being intended to be fastened to a wall, such as that of the fuselage of the aircraft. The markers 28 are in the form of a scale for measuring lengths corresponding to the thickness of ice on the studied surface. In the embodiment illustrated, the plate 24 is in a transverse plane orthogonal to the central longitudinal axis X of the tube 17; the markers 28 are in the form of concentric circles 30 (30', 30", 30'" in FIG. 2) with different diameters. Each circle 30 corresponds to a determined thickness of ice on the studied surface 4 of the first arm. The circles 30 may, for example, be painted on the plate 24 in a bright color that the eye can distinguish easily. The visibility of the circles may be accentuated by providing a backlighting system. According to one possible example, the backlighting system can be made from light-emitting diodes. When the de-icing system 19 of the first arm is engaged, the backlighting system passes from a continuous lighting mode to a discontinuous mode of flashing type so as to warn the crew that de-icing has indeed been triggered. The backlighting is different depending on the operating phase of the measurement device: it indicates, depending on the selected backlighting, the phase that the measurement device is in (measurement, de-icing, anomaly, overheating, etc.).

The first arm 10 can also comprise a device 15 for lighting the ice, making it possible to illuminate it so as to make it easier to measure the surface thereof The lighting device could comprise, for example, light-emitting diodes fastened to the studied surface of the first arm.

The second arm 12 has an oblong envelope. In the embodiment illustrated, it comprises a rigid tube 32 forming an enclosure for housing the system 14. In the example illustrated, the tube 32 has a cylindrical shape of circular section. The shape of the arm could be different and the second arm 12 could, for example, comprise a flat surface so as to improve the aerodynamics. The second arm is therefore hollow, so as to allow the wires/cables necessary for the operation of the various components such as the acquisition system or other components described below to pass through. However, it could be solid or partially hollow in the case of the use of wireless technology or components that do not require power supply or connection to a control system. Like the tube 17, the tube 32 is constituted of one or more materials giving it a rigid structure that allows it to be solid enough to withstand the stream F and not deform, or deform only very slightly. In the example illustrated, the tube 32 is made of metal such as aluminum. In the example illustrated, the system 14 is a camera 14, preferably a high-definition camera, disposed so as to acquire, through the orifice 16 provided for this purpose, images of the studied surface 4 on the first arm. As seen above, the camera is only an example. The image may be, according to another example, a set of points and the system 14 may use lidar technology. The image could also be produced by a profilometer. In the example illustrated, the camera 14 is fastened inside the tube 32 so as to cover the entire studied surface 4. The camera 14 is connected to the control system 23 and may be connected to an image storage device and/or to one or more viewing screens provided in the cockpit or elsewhere using wires/cables 33 extending along the first and second arms and passing through the fuselage or using wireless technologies that are commonly used nowadays. The tube 32 houses a device 34 emitting a laser beam 36 shown in dashed line in FIG. 2 making it easier to measure the thickness of ice by making a line on the surface of the ice visible.

The second arm 12 is provided with a heating system 38, visible in FIG. 2, which makes it possible to heat and/or de-ice, at least partially, the enclosure that houses the image acquisition system 14. In the case of a camera 14, the heating makes it possible to avoid the obstruction of the lens by the ice. In the embodiment illustrated, the heating system 38 is in the form of a plurality of electrical heating resistors 40 distributed inside the tube 32. The heating system 38 has a temperature regulation system 42 that makes it possible to measure the temperature inside the tube 32 near the image acquisition system 14 and regulate it so that it is high enough to allow the protection of the components or possible necessary de-icing but not excessive so as to avoid any overheating that could lead to impairment of the operation of the system 14 and/or of other components that are incorporated into the tube 32. The regulation system 42 is of the known type using a temperature probe, thermal switch or any other means.

The second arm 12 has a plurality of portions 44, 46, 48: a first portion 44 fastened to the first arm 10, a second portion 46 removably associated with the first portion 44 and housing the acquisition system 14 and other components as seen above and a third portion 48 removably associated with the second portion 46 and closing the enclosure. The first and second portion could be made of a single block. The second and third portion could also be made of a single block. Providing a plurality of blocks that are removably fastened to one another makes it easier to intervene in the event of failure or of changing of a component regarding the heating system 38, the laser device 34 or the temperature regulation system 42 or any other additional component inside the enclosure. The three portions could also be made of a single block and the second arm could then have a hatch for access to the components housed inside the enclosure. The term "removable" means that it is possible to separate the portions that are independent of one another without damaging them and to connect them again without this damaging their coupling system. In the embodiment illustrated, the portions 44 and 46 and also 46 and 48 are interlocked with one another so as to be fastened by nesting. The first portion 44 is fastened to the first arm 10 removably or so as to form just one single piece therewith. The free end of the second arm, which is the end opposite that connected to the first arm, and in the case in which the second arm has three portions, the free end of the third portion 48, has a shape of which the perimeter decreases continuously as far as its free end; in the embodiment illustrated, the third portion 48 has a tapered shape with a rounded blunt tip.

The measurement device 2 operates as follows. It is fastened to the outer surface 6 of the aircraft 8. In the example illustrated in FIG. 1, the device is fastened near a window 50 of the cockpit and longitudinally behind same. It is fastened by one of the free ends 31 to the aircraft such that the studied surface 4 passes through the stream of air F flowing along the outer surface 6. The second arm 12 and, in particular, the longitudinal axis Y is in the direction of the stream of air F so as to avoid creating turbulence that could disturb the measurements as much as possible. The tapered shape of the third portion 48 also makes it possible to limit these disturbances.

The pilot, the flight engineer or any other person starts the heating system 38 so as to protect all the components incorporated into the tube 32 of the first arm against cold temperatures at altitude or even on the ground. The heating system 38 can also be triggered automatically by providing a temperature sensor making it possible to engage it at a threshold temperature and stop it when the temperature rises back above this threshold temperature. When the pilot or the flight engineer (or any other person) desires, he or she triggers the operation of the image acquisition system 14; the triggering can also be realized automatically depending on the altitude reached by the aircraft or the prerecorded flight phase or any other parameter. Using the received image and the laser beam 36, the pilot, the flight engineer or any other person can evaluate the thickness of the ice using the measurement scale. The images are also collected for computer analysis. The processing of the images is automatic and can use artificial intelligence such as automatic learning. By analyzing the images once collected, it is also possible to evaluate the speed at which the ice accumulates depending on the weather conditions and many other parameters. When the test has ended, it is possible to return the device 2 to its condition of use for another test by virtue of the de-icing system 19 of the first arm 10: it makes it possible to completely rid the studied surface 4 of any presence of ice so that it is ready for other evaluations.

The measurement device 2 described is particularly advantageous because it incorporates the system for acquiring images of the measured surface. It makes it possible to have a constant viewing angle for the acquisition system allowing use and reuse without having to adjust it. Reading is simple using the markers 28 on the plate 24, which, in this case, is in the shape of a disc, and the laser beam 36. By virtue of the quality of the images from current cameras, it is possible, in addition to the thickness of the ice and its speed of accumulation, to obtain information on the temperature and the external conditions according to the color of the ice (from transparent to opaque white). The possibility of disassembling the second arm 12 into a plurality of parts allows easy access to the components incorporated therein so as to make maintenance or replacement thereof easier in the event of failure. It also makes it possible to change the arm 12 so as to provide a longer or shorter one, or one that incorporates different components, for example components that are more advanced. By incorporating all the elements necessary for the test, it is quick and easy to remove the system once the test has ended.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for measuring a thickness of an accretion of ice on a studied surface, comprising
    two arms being a first arm and a second arm,
        said second arm forming an enclosure for housing an image acquisition system,
    a central longitudinal axis of a portion of the second arm bearing the acquisition system making an angle with a central longitudinal axis of a part of the first arm bearing the studied surface,
the image acquisition system being disposed so as to acquire, through an orifice, images of a part of said studied surface on the first arm.

2. The measurement device according to claim 1, wherein the two arms each respectively have a rigid cylindrical tube.

3. The measurement device according to claim 1, wherein the first arm bears a plate of which a surface that is oriented towards the acquisition system has markers making it possible to evaluate the thickness of the accretion of ice.

4. The measurement device according to claim 3, wherein said plate is in a transverse plane orthogonal to the central longitudinal axis of the second arm.

5. The measurement device according to claim 3, wherein the markers are formed as a scale for measuring lengths corresponding to the thickness of the accretion of ice on the studied surface.

6. The measurement device according to claim 3, wherein the plate comprises different backlighting depending on operating phases of the measurement device.

7. The measurement device according to claim 1, wherein the second arm is provided with a heating system that makes it possible to at least one of heat or de-ice, at least partially, the enclosure that houses the image acquisition system.

8. The measurement device according to claim 1, wherein the second arm houses a device emitting a laser beam.

9. The measurement device according to claim 1, wherein the first arm has an elbow dividing the first arm into two parts on either side of the elbow, one bearing the second arm and the other having the studied surface.

10. The measurement device according to claim 1, wherein the central longitudinal axis of the second arm makes an angle of approximately 90 degrees with the central longitudinal axis of the first arm bearing the studied surface.

11. The measurement device according to claim 1, wherein the second arm has a plurality of portions, a first portion fastened to the first arm, a second portion removably associated with the first portion and housing the acquisition system and a third portion removably associated with the second portion and closing the enclosure.

12. The measurement device according to claim 1, wherein a free end of the second arm, which is an end opposite that connected to the first arm, has a shape of which a perimeter decreases continuously to the free end.

13. The measurement device according to claim 1, wherein the first arm comprises a device for lighting the accretion of ice.

14. An aircraft comprising a measurement device according to claim 1, wherein the first arm, at one of its free ends, is fastened to the aircraft such that the first arm forms a projection with respect to an outer surface of the aircraft and such that the studied surface passes through a stream of air flowing along the outer surface of the aircraft.

15. The aircraft according to claim 14, wherein the second arm is oriented in a direction of said stream of air.

* * * * *